US010605341B2

(12) United States Patent
Wu

(10) Patent No.: US 10,605,341 B2
(45) Date of Patent: Mar. 31, 2020

(54) ACTUATOR WITH SWITCHABLE RELEASING SPEED

(71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 268 days.

(21) Appl. No.: 15/792,760

(22) Filed: Oct. 25, 2017

(65) Prior Publication Data

US 2019/0093743 A1 Mar. 28, 2019

(30) Foreign Application Priority Data

Sep. 22, 2017 (TW) .............................. 106132584 A

(51) Int. Cl.
*F16H 27/02* (2006.01)
*F16H 29/02* (2006.01)
(Continued)

(52) U.S. Cl.
CPC ......... *F16H 25/2015* (2013.01); *H02K 5/143* (2013.01); *H02K 7/116* (2013.01);
(Continued)

(58) Field of Classification Search
CPC ..... F16H 2025/2062; F16H 2025/2081; F16H 2025/2084; F16H 2025/209;
(Continued)

(56) References Cited

U.S. PATENT DOCUMENTS 5,485,049 A * 1/1996 Shannon ................ H01R 39/26
310/248
8,006,332 B2 * 8/2011 Lemire .................. A61G 7/005
5/600
(Continued)

FOREIGN PATENT DOCUMENTS

DE 19603318 A1 8/1997
DE 102007013354 A1 9/2008
(Continued)

OTHER PUBLICATIONS

Office Action dated Jan. 8, 2018 of the corresponding Taiwan patent application No. 106132584.
(Continued)

*Primary Examiner* — Jake Cook
(74) *Attorney, Agent, or Firm* — Chun-Ming Shih; HDLS IPR Services

(57) ABSTRACT

An actuator with switchable releasing speed includes an actuation rod, a screw, and a motor. The motor drives the screw rotating so that the actuation rod axially moves relative to the screw. The motor includes a stator, a rotor, a plurality of commutators, and at least three brushes. The at least three brushes have a positive brush, a negative brush, and at least one auxiliary brush. The positive brush is connected to a positive DC voltage. One of the negative brush and the least one auxiliary brush is adjusted to connect to a negative DC voltage so as to change a rotational speed of the rotor, thereby controlling a movement speed of the actuation rod. Accordingly, the releasing speed of the actuator is switchable.

20 Claims, 8 Drawing Sheets

(51) Int. Cl.
*F16H 25/20* (2006.01)
*H02K 23/20* (2006.01)
*H02K 7/14* (2006.01)
*H02K 7/116* (2006.01)
*H02K 5/14* (2006.01)
*H02K 7/06* (2006.01)

(52) U.S. Cl.
CPC ............ *H02K 7/1166* (2013.01); *H02K 7/14* (2013.01); *H02K 23/20* (2013.01); *F16H 2025/209* (2013.01); *F16H 2025/2081* (2013.01); *F16H 2025/2084* (2013.01); *H02K 7/06* (2013.01)

(58) Field of Classification Search
CPC .... F16H 25/2015; H02K 23/20; H02K 5/143; H02K 7/06; H02K 7/116; H02K 7/1166; H02K 7/14
See application file for complete search history.

(56) References Cited

U.S. PATENT DOCUMENTS 8,415,911 B2 * 4/2013 Lau ........................... H02P 7/08
318/139

8,421,380 B2 * 4/2013 Lau ........................ H02K 23/20
310/248

FOREIGN PATENT DOCUMENTS

| | | |
|---|---|---|
| JP | 2004100931 A | 4/2004 |
| JP | 2004248460 A | 9/2004 |
| JP | 2010022201 A | 1/2010 |
| JP | 2010068592 A | 3/2010 |
| JP | 2012132464 A | 7/2012 |
| JP | 2015509036 A | 3/2015 |
| JP | 2016210236 A | 12/2016 |
| KR | 20110006332 A | 1/2011 |
| TW | 264585 B | 12/1995 |
| TW | 201443354 A | 11/2014 |
| TW | M537167 U | 2/2017 |
| WO | 2014157242 A1 | 2/2017 |

OTHER PUBLICATIONS

Office Action dated Sep. 4, 2018 of the corresponding Japan patent application No. 2017-211914 & Office Action dated Sep. 14, 2018 of the corresponding Korea patent application No. 10-2017-0142222.

Office Action dated Jun. 4, 2018 of the corresponding Deutsch patent application No. 102017127296.8.

* cited by examiner

ACTUATOR WITH SWITCHABLE RELEASING SPEED

BACKGROUND OF THE INVENTION

Technical Field

The present disclosure relates to an actuator, and more particularly to an actuator with switchable releasing speed.

Description of Related Art

Actuators are commonly applied to electric hospital beds, electric dental chairs, electric lifting wheelchairs, electric computer tables, and so on. Basically, the actuators are commonly used in applications of adjusting level and/or elevation.

Please refer to FIG. 1, which shows a perspective view of a conventional actuator. The conventional actuator 200 (hereinafter referred to as "actuator 200") has an outer tube 201, and an actuation rod 202 is provided in the outer tube 201. The actuation rod 202 is hollow and a screw 203 is provided in the actuation rod 202. Also, one end of the actuation rod 202 is engaged with the thread of the screw 203. The actuator 200 further has a motor 204, and the motor 204 is used to drive the screw 203 axially rotating so as to drive the actuation rod 202 axially moving relative to the screw 203.

Take the electric hospital bed for example, one end of the outer tube 201 of the actuator 200 is fixed on a bed shelf and the actuator rod 202 is connected to the bed. In order to accurately adjust the level and/or elevation of the bed, a manual adjustment mechanism is usually provided for an operator or a user to adjust and control the electric hospital bed. In general, the conventional manual adjustment mechanism is driven by the actuation rod 202, and the actuation rod 202 axially moves relative to the screw 203 driven by the motor 204. Moreover, a lock mechanism is provided. When the motor 204 drives the screw 203 rotating, the lock mechanism is used to lock the actuation rod 202 so that the actuation rod 202 fails to axially move relative to the screw 203. Therefore, it is inconvenient and laborious for the operator or the user to manually operate the conventional actuator 200.

Since the force produced from the actuator 200 is quite large when the actuator 200 operates and the lock mechanism includes a few small components which have less strength than other parts of the actuator 200, the actuator 200 easily operates with biased due to uneven forces. Moreover, the screw 203 is driven by the motor 204 to make the actuator 200 actuate the electric hospital bed slowly moving up and down. However, the electric hospital bed fails to quickly restore to the original horizontal position for the emergency medical treatment once an emergency situation occurs, and therefore it would affect the golden hours of saving the patient's life to cause unfortunate occurrence.

With the existing quick release solution, a high-speed releasing mechanism 205 is usually connected to one side of the actuation rod 202. However, the introduction of the high-speed releasing mechanism 205 increases the volume of the actuator 200 and affects the installation distance and appearance of the product.

Accordingly, the present disclosure is proposed to make an actuator be used in different opportunities for the operator with convenient operation, thereby achieving speed adjustment as well as high-speed release to deal with the emergency situations.

SUMMARY OF THE INVENTION

An objective of the present disclosure is to provide an actuator with switchable releasing speed to solve the actuator fails to adjust releasing speed in different opportunities.

In order to achieve the above-mentioned objective, the actuator with switchable releasing speed includes an actuation rod, a screw, and a motor. The screw is screwed into the actuation rod. The motor drives the screw rotating so that the actuation rod axially moves relative to the screw. The motor includes a stator, a rotor, a plurality of commutators, and at least three brushes. The stator has a plurality of permanent magnet poles. The rotor has a plurality of windings, and the rotor rotates relative to the stator. The commutators are correspondingly connected to the windings. The at least three brushes include a positive brush, a negative brush, and at least one auxiliary brush. The positive brush is connected to a positive direct-current voltage. One of the negative brush and the at least one auxiliary brush is adjusted to connect to a negative direct-current voltage so as to change a rotational speed of the rotor of the motor, whereby controlling a movement speed of the actuation rod.

In one embodiment, the actuator with switchable releasing speed further includes a worm wheel and a worm gear. The worm wheel is connected to the screw. The worm gear has two ends, one end is connected to a shaft of the rotor of the motor and the other end is engaged with the worm wheel. When the shaft of the rotor rotates, the worm gear drives the worm wheel rotating to drive the screw so that the actuation rod axially moves relative to the screw.

In one embodiment, an angle increment between the negative brush and each of the at least one auxiliary brush is:

$D=60$, when $N=1$;
$D=180/(N+1)$, when $N>1$;

where D is the angle increment (unit in degree) and N is the amount of the at least one auxiliary brush.

In one embodiment, the at least one auxiliary brush is arranged at the same side in which the positive brush is collinear with the negative brush.

In one embodiment, the actuator with switchable releasing speed further includes a multistage switch. The multistage switch includes a common contact and a plurality of tapping contacts. The common contact is connected to the negative direct-current voltage. The tapping contacts are respectively connected to the negative brush and the at least one auxiliary brush. One of the tapping contacts is switched to connect to the common contact so that the negative brush or the at least one auxiliary brush is connected to the negative direct-current voltage through the common contact.

In one embodiment, the movement speed of the actuation rod is the lowest when the negative brush is connected to the negative direct-current voltage.

In one embodiment, the movement speed of the actuation rod is the highest when the at least one auxiliary brush which is the farthest away from the negative brush is connected to the negative direct-current voltage.

In one embodiment, the movement speed of the actuation rod is between the lowest and the highest when the at least one auxiliary brush which is between the negative brush and the farthest away from the negative brush is connected to the negative direct-current voltage.

In one embodiment, the windings and the commutators are designed as a symmetrical lap winding.

In one embodiment, the motor is a permanent magnet-direct current motor.

In one embodiment, the screw is a non-self-locking screw.

In one embodiment, the permanent magnet poles of the stator are alternately arranged in a circumferential direction of the stator; the windings of the rotor are correspondingly wound on grooves of an iron core of the rotor.

Accordingly, the actuator with switchable releasing speed of the present disclosure is used to operate in different releasing speeds.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawing as follows.

DETAILED DESCRIPTION

Figure 1:
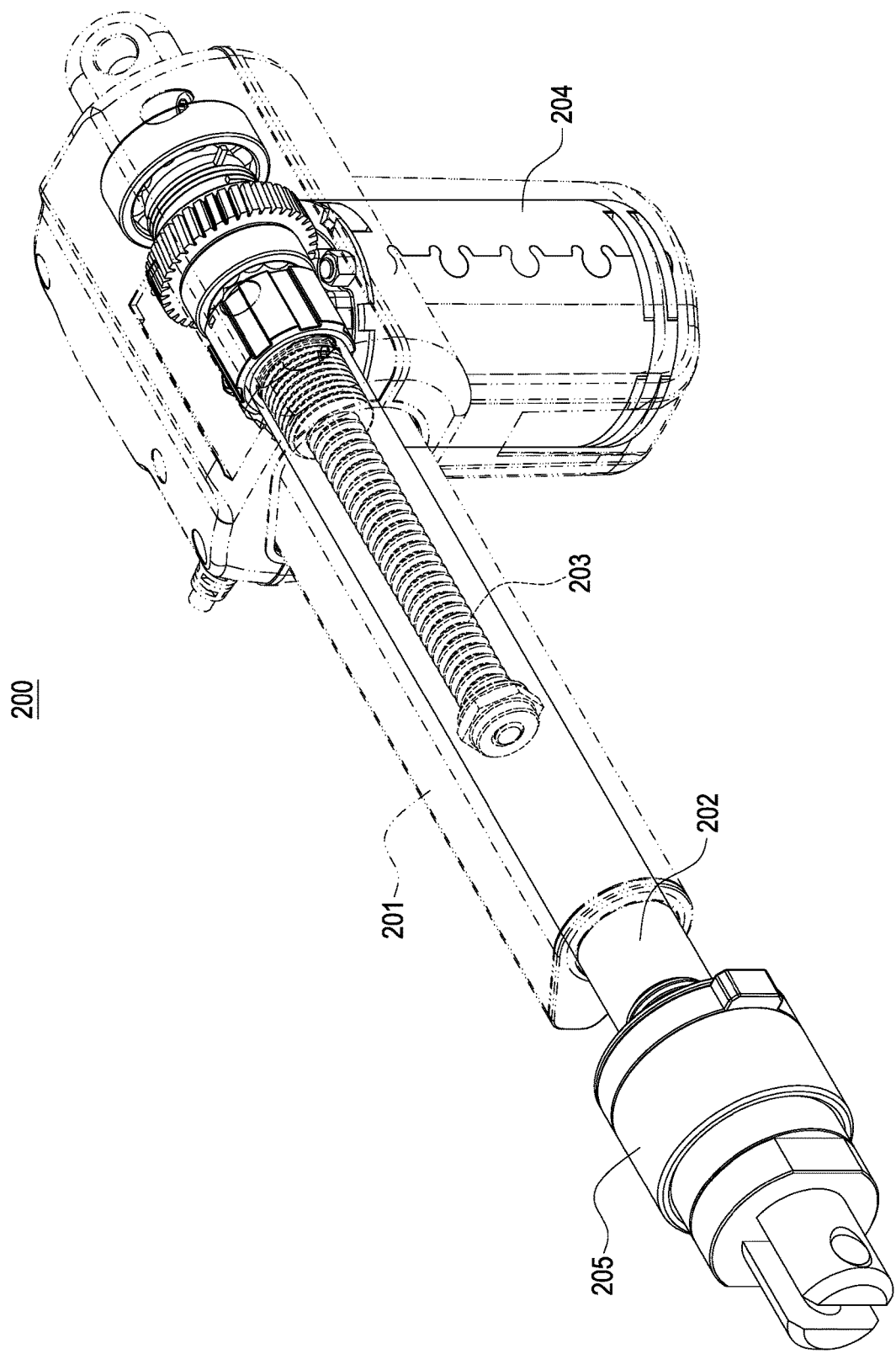
FIG. 1 is a perspective view of a conventional actuator.

Reference will now be made to the drawing figure to describe the present disclosure in detail. It will be understood that the drawing figure and exemplified embodiments of present disclosure are not limited to the details thereof.

Figure 2:
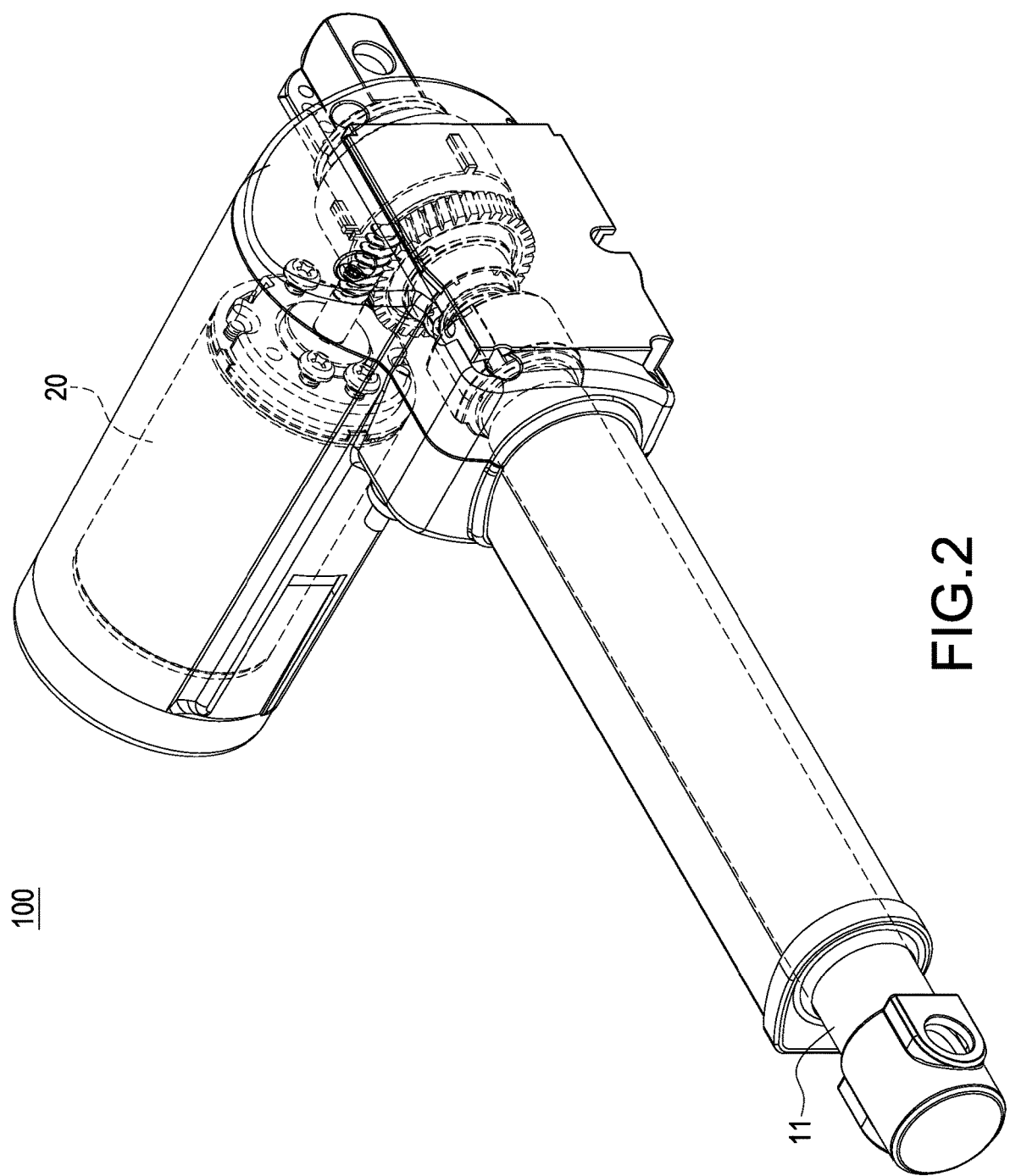
FIG. 2 is a perspective view of an actuator with switchable releasing speed according to the present disclosure.
Figure 3:
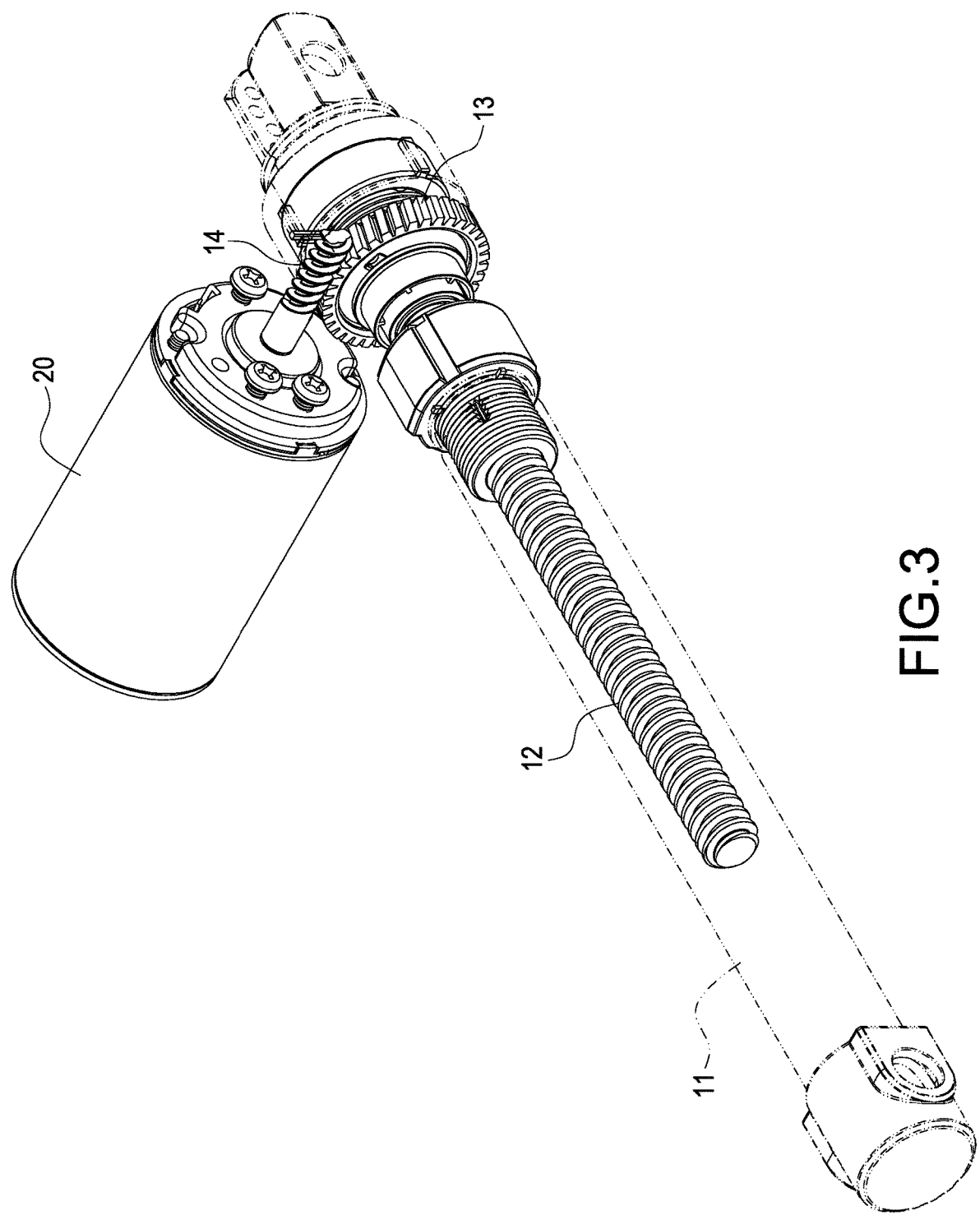
FIG. 3 is a partial perspective view of the actuator with switchable releasing speed according to the present disclosure.

Please refer to FIG. 2 and FIG. 3, which show a perspective view and a partial perspective view of an actuator with switchable releasing speed according to the present disclosure, respectively. The actuator with switchable releasing speed (hereinafter referred to as "actuator") includes an actuation rod 11, a screw 12, a worm wheel 13, a worm gear 14, and a motor 20. The screw 12 is screwed into the actuation rod 11, and the worm wheel 13 is connected to the screw 12. The worm gear 14 also referred to as "lead screw" has two ends, one end is connected to a shaft of a rotor of the motor 20 and the other end is engaged with the worm wheel 13. When the shaft of the rotor rotates, the worm gear 14 drives the worm wheel 13 rotating to drive the screw 12 so that the actuation rod 11 axially moves relative to the screw 12. In this embodiment, the motor 20 may be, for example but limited to, a permanent magnet direct-current (PMDC) motor. In addition, the screw 12 may be, for example but not limited to, a non-self-locking screw.

The motor 20, namely the PMDC motor includes a stator, a rotor, a plurality of commutators, and at least three electrical brushes (hereinafter referred to as "brush"). The stator is a stationary portion of the motor 20 and the rotor is a rotatable portion of the motor 20, namely the rotor rotates relative to the stator. In this embodiment, the stator may be a permanent magnet as a field magnet has a plurality of permanent magnetic poles for providing a fixed magnetic field. For example, if the stator is a four-pole structure, it means that the stator has two N magnetic poles and two S magnetic poles, and the four poles are alternately arranged in a circumferential direction of the stator. In other words, the four poles are arranged at intervals of 90 degrees in the space, namely they are alternately arranged in a different polarity, such as an arrangement of N pole-S pole-N pole-S pole.

The rotor has an iron core, also referred to as "armature core", having a plurality of grooves. The grooves are arranged at equal intervals along a circumferential direction of the armature core. The rotor further includes a plurality of windings, also referred to as "armature winding" correspondingly wound on the grooves of the armature core.

The commutators and the at least three brushes are electricity collectors of the motor 20. The commutators are insulated from each other and the commutators are correspondingly connected to outlet ends of the armature windings wound on the grooves of the armature core. In this embodiment, according to the connection relationship between the armature windings and the commutators, the armature winding may be, for example but not limited to, designed as a lap winding. Furthermore, the lap winding could be designed as a symmetrical lap winding, a double-layer lap winding, a forward progression lap winding, or a combination of the above-mentioned types.

For the DC motor, the brushes are used to receive an external DC power source, and then the commutators convert the DC power source into an AC power source for the armature windings. Also, a magnetic force is created by a current flowing through the armature windings, also referred to as "armature current" and the permanent magnet (i.e., the stator) to make the rotor rotate.

Figure 4A:
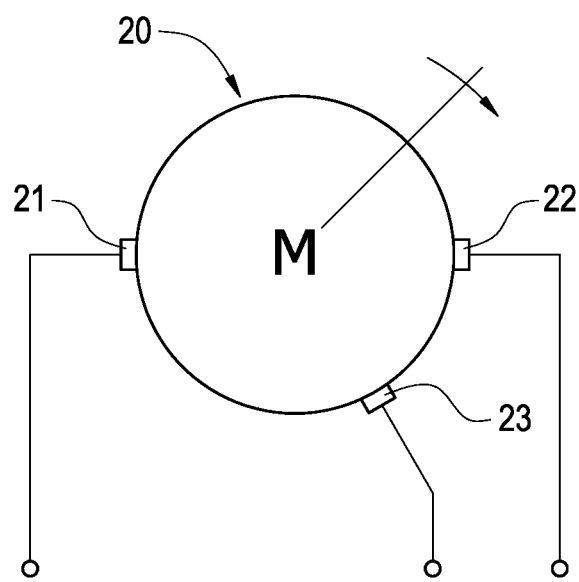
FIG. 4A is a schematic view of a motor of the actuator according to a first embodiment of the present disclosure.
Figure 4B:
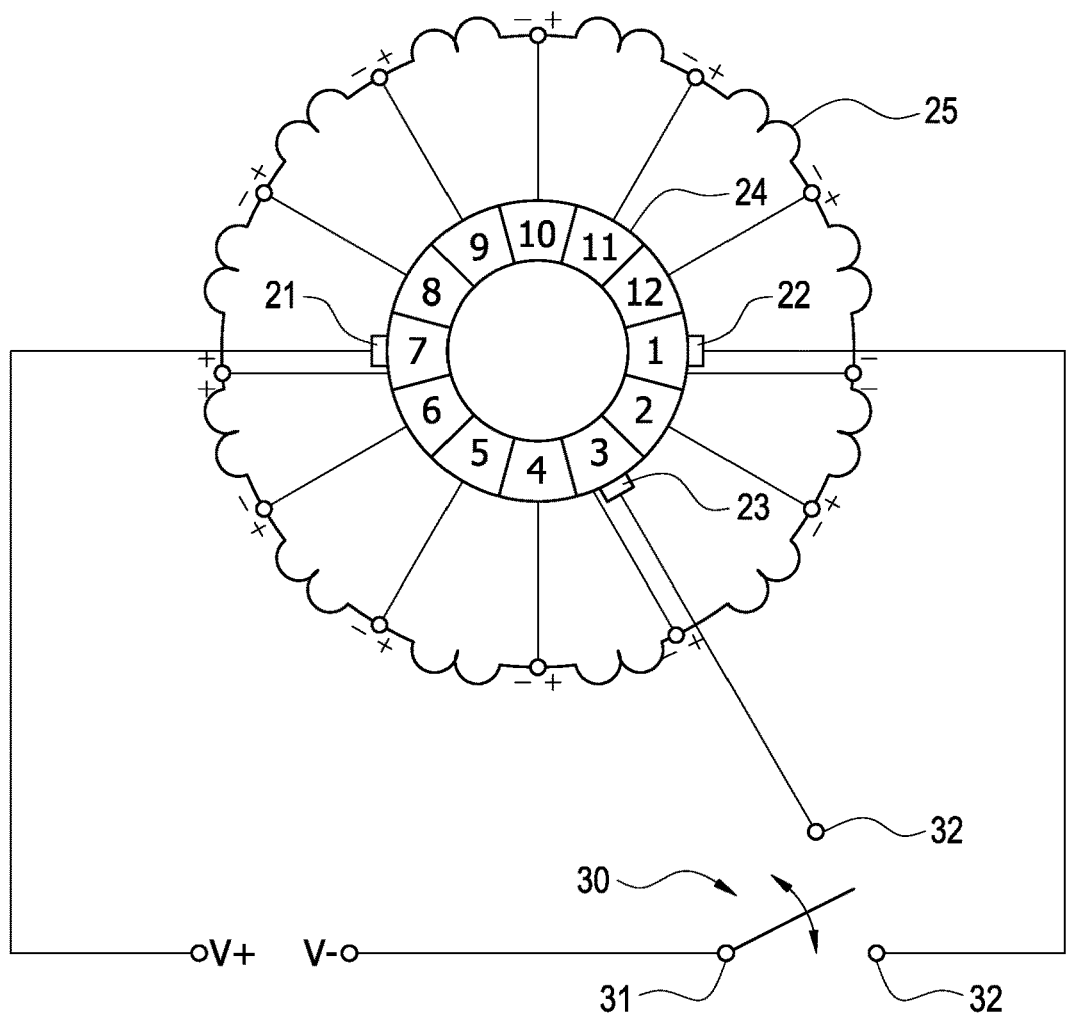
FIG. 4B is a schematic view of an armature structure of the motor in FIG. 4A.

Please refer to FIG. 4A and FIG. 4B, which show a schematic view of a motor of the actuator and a schematic view of an armature structure of the motor in FIG. 4A according to a first embodiment of the present disclosure, respectively. In order to describe the operation of the motor 20, the description will be made with reference to the example.

As mentioned above, the motor 20 includes at least three brushes. The at least three brushes includes a positive brush 21, a negative brush 22, and at least one auxiliary brush 23. As shown in FIG. 4B, the positive brush 21 is connected to a positive direct-current (DC) voltage V+. The negative brush 22 or the at least one auxiliary brush 23 is connected to a negative direct-current (DC) voltage V−. The positive DC voltage V+ and the negative DC voltage V− are supplied by an external DC power source.

In the present disclosure, a position relationship between the negative brush 22 and the at least one auxiliary brush 23 is that an angle increment is formed between the negative brush 22 and each of the at least one auxiliary brush 23, and the at least one auxiliary brush 23 is arranged at the same side in which the positive brush 21 is collinear with the negative brush 22. The angle increment is:

D=60, when N=1;

D=180/(N+1), when N>1;

where D is the angle increment (unit in degree) and N is the amount of the at least one auxiliary brush 23. The first embodiment shown in FIG. 4A or FIG. 4B is exemplified for further demonstration. Since the number of the at least one auxiliary brush 23 is one in the first embodiment, the angle increment formed between the negative brush 22 and the auxiliary brush 23 is 60 degrees, that is, a space angle difference between the negative brush 22 and the auxiliary brush 23 is 60 degrees. As shown in FIG. 4B, the connection relationship between the windings 25 and the commutators 24 is designed as a symmetrical lap winding, and the number of the commutators 24 is twelve. At a rotation moment, when positive brush 21 corresponds to the commutator No. 7 and the negative brush 22 corresponds to the number No. 1, the auxiliary brush 23 corresponds to the commutator No. 3 since the angle increment formed between the negative brush 22 and the auxiliary brush 23 is 60 degrees.

The actuator 100 further includes a multistage switch 30, and the multistage switch 30 has a common contact 31 and a plurality of tapping contacts 32. The common contact 31 is connected to the negative DC voltage V−, and the tapping contacts 32 are respectively connected to the negative brush 22 and the at least one auxiliary brush 23. By switching one of the tapping contacts 32 to connect to the common contact 31, the negative brush 22 or the at least one auxiliary brush 23 is connected to the negative DC voltage V− through the common contact 31.

As shown in FIG. 4B, the negative brush 22 is connected to a lower tapping contact of the tapping contacts 32 and the auxiliary brush 23 is connected to an upper tapping contact of the tapping contacts 32. When the multistage switch 30 is switched to the lower tapping contact, the negative brush 22 is connected to the negative DC voltage V− through the common contact 31. On the contrary, when the multistage switch 30 is switched to the upper tapping contact, the auxiliary brush 23 is connected to the negative DC voltage V− through the common contact 31. Accordingly, the rotational speed of the motor 20 is changed to control the movement speed of the actuation rod 11 by switching one of the negative brush 22 and the at least one auxiliary brush 23 to connect to the negative DC voltage V−, thereby providing a two-stage selection of the releasing speed of the actuator 100, including a normal releasing speed and a high releasing speed, or a low releasing speed and a high releasing speed.

Figure 4C:
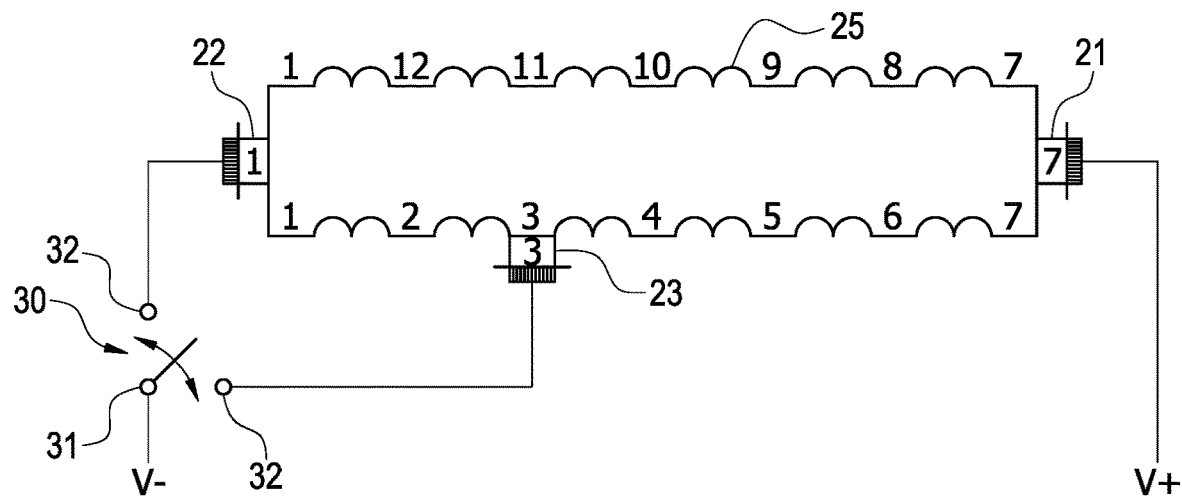
FIG. 4C is a schematic view of the equivalent armature structure in FIG. 4B.

Please refer to FIG. 4C, which shows a schematic view of the equivalent armature structure in FIG. 4B. The negative brush 22 or the at least one auxiliary brush 23 is adjusted to connect to the negative DC voltage V− by switching the multistage switch 30 so as to change the number of the windings 25 in the magnetic path between the positive DC voltage V+ and the negative DC voltage V− and therefore to change the releasing speed of the actuator 100. As exemplified in FIG. 4C, when the multistage switch 30 is switched to make the negative brush 22 connect to the negative DC voltage V−, two magnetic paths are formed between the positive brush 21 and the negative brush 22, namely an upper magnetic path and a lower magnetic path. The upper magnetic path is sequentially formed from the winding No. 7, through the winding No. 8, the winding No. 9, the winding No. 10, the winding No. 11, the winding No. 12, and to the winding No. 1. The lower magnetic path is sequentially formed from the winding No. 7, through the winding No. 6, the winding No. 5, the winding No. 4, the winding No. 3, the winding No. 2, and to the winding No. 1. The number of the windings of the upper magnetic path is equal to the number of the windings of the lower magnetic path. After two back-emfs (electromotive forces) generated from the two magnetic paths having the same number of the windings are offset, it makes the motor 20 rotate in a lower speed when the back-emfs are balanced with the DC power source.

When the multistage switch 30 is switched to make the auxiliary brush 23 corresponding to the commutator No. 3 connect to the negative DC voltage V−, two magnetic paths are formed between the positive brush 21 and the negative brush 22, namely an upper magnetic path and a lower magnetic path. The upper magnetic path is sequentially formed from the winding No. 7, through the winding No. 8, the winding No. 9, the winding No. 10, the winding No. 11, the winding No. 12, the winding No. 1, the winding No. 2, and to the winding No. 3. The lower magnetic path is sequentially formed from the winding No. 7, through the winding No. 6, the winding No. 5, the winding No. 4, and to the winding No. 3. The number of the windings of the upper magnetic path is greater than the number of the windings of the lower magnetic path. After two back-emfs generated from the two magnetic paths having different number of the windings are offset, it makes the motor 20 rotate in a higher speed (compared to two magnetic paths having the same number of the windings) when the back-emfs are balanced with the DC power source due to the increasing rotational speed of the motor 20.

In summary, when the multistage switch 30 is switched to make the negative brush 22 connect to the negative DC voltage V−, a rotational speed of the shaft of the motor 20 is the lowest so that the releasing speed of the actuator 100 is the lowest. On the contrary, when the multistage switch 30 is switched to make the auxiliary brush 23 connect to the negative DC voltage V−, the rotational speed of the shaft of the motor 20 is the highest so that the releasing speed of the actuator 100 is the highest. Accordingly, the rotational speed of the motor 20 is changed to control the movement speed of the actuation rod 11 by switching one of the negative brush 22 and the at least one auxiliary brush 23 to connect to the negative DC voltage V−, thereby changing the releasing speed of the actuator 100.

Figure 5A:
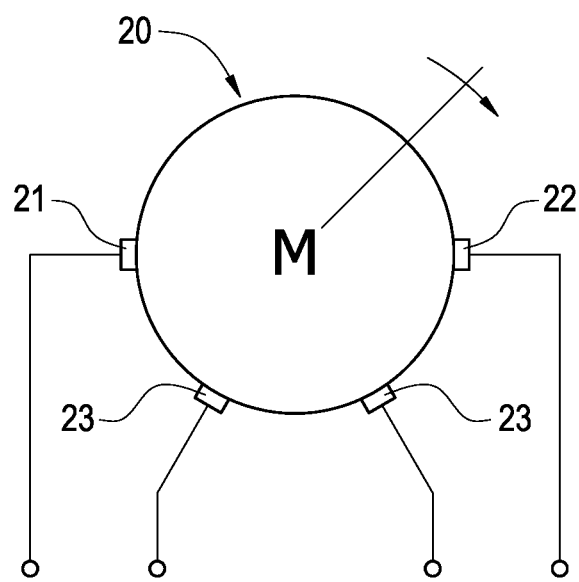
FIG. 5A is a schematic view of the motor of the actuator according to a second embodiment of the present disclosure.
Figure 5B:
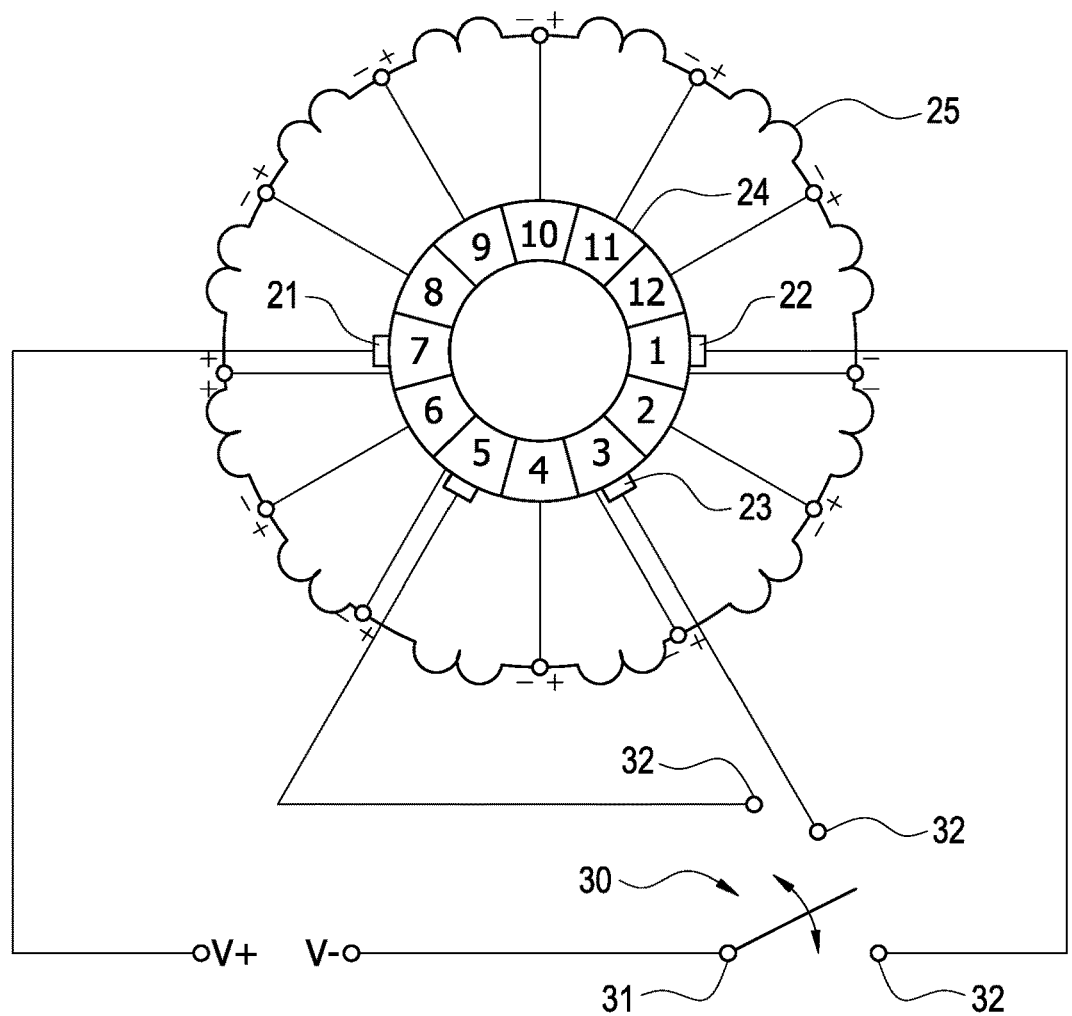
FIG. 5B is a schematic view of an armature structure of the motor in FIG. 5A.

Please refer to FIG. 5A and FIG. 5B, which show a schematic view of a motor of the actuator, a schematic view of an armature structure of the motor in FIG. 5A according to a second embodiment of the present disclosure, respectively. The major difference between the second embodiment and the first embodiment is that the number of the at least one auxiliary brush 23 is two, including a first auxiliary brush 23 and a second auxiliary brush 23 in the former. The first auxiliary brush 23 corresponds to the commutator No. 3 and the second auxiliary brush 23 corresponds to the commutator No. 5. Since the number of the at least one auxiliary brush 23 is two in the second embodiment, the angle increment formed between the negative brush 22 and each of the at least one auxiliary brush 23 is 60 degrees, that is a space angle difference between the negative brush 22 and the first auxiliary brush 23 is 60 degrees and a space angle difference between the negative brush 22 and the second auxiliary brush 23 is 120 degrees. As shown in FIG. 5B, the connection relationship between the windings 25 and the commutators 24 is designed as a symmetrical lap winding, and the number of the commutators 24 is twelve. At a rotation moment, when positive brush 21 corresponds to the commutator No. 7 and the negative brush 22 corresponds to the number No. 1, the first auxiliary brush 23 corresponds to the commutator No. 3 and the second auxiliary brush 23 corresponds to the commutator No. 5 since the angle increment formed between the negative brush 22 and each of the auxiliary brush 23 is 60 degrees.

The actuator 100 further includes a multistage switch 30, and the multistage switch 30 has a common contact 31 and a plurality of tapping contacts 32. The common contact 31 is connected to the negative DC voltage V−, and the tapping contacts 32 are respectively connected to the negative brush 22 and the at least one auxiliary brush 23. By switching one of the tapping contacts 32 to connect to the common contact 31, the negative brush 22 or the at least one auxiliary brush 23 is connected to the negative DC voltage V− through the common contact 31.

As shown in FIG. 5B, the negative brush 22 is connected to a lower tapping contact of the tapping contacts 32, the first auxiliary brush 23 is connected to a middle tapping contact of the tapping contacts 32, and the second auxiliary brush 23 is connected to an upper tapping contact of the tapping contacts 32. When the multistage switch 30 is switched to the lower tapping contact, the negative brush 22 is connected to the negative DC voltage V− through the common contact 31. When the multistage switch 30 is switched to the middle tapping contact, the first auxiliary brush 23 corresponding to the commutator No. 3 is connected to the negative DC voltage V− through the common contact 31. When the multistage switch 30 is switched to the upper tapping contact, the first auxiliary brush 23 corresponding to the commutator No. 5 is connected to the negative DC voltage V− through the common contact 31. Accordingly, the rotational speed of the motor 20 is changed to control the movement speed of the actuation rod 11 by switching one of the negative brush 22 and the at least one auxiliary brush 23 to connect to the negative DC voltage V−, thereby providing a three-stage selection of the releasing speed of the actuator 100, including a normal releasing speed, a high releasing speed, and a very-high releasing speed, or a low releasing speed, a middle releasing speed, and a high releasing speed.

Figure 5C:
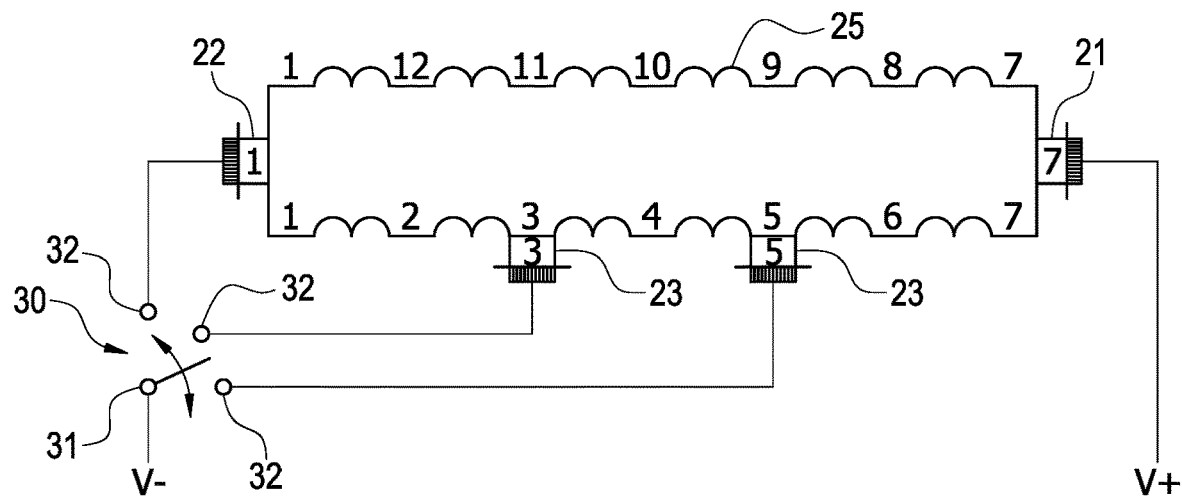
FIG. 5C is a schematic view of the equivalent armature structure in FIG. 5B.

Please refer to FIG. 5C, which shows a schematic view of the equivalent armature structure in FIG. 5B. As mentioned above, when the difference between the two back-emfs generated from the two magnetic paths having different number of the windings is larger, the rotational speed of the motor 20 needs to increase so that the back-emfs are balanced with the DC power source. When the negative DC voltage V− is connected from the first auxiliary brush 23 corresponding to the commutator No. 3 to the first auxiliary brush 23 corresponding to the commutator No. 5, the difference between the two back-emfs generated from the two magnetic paths having different number of the windings becomes larger, and therefore the rotational speed of the motor 20 needs to increase to balance the back-emfs with the DC power source. In other words, when the negative DC voltage V− is connected from the first auxiliary brush 23 corresponding to the commutator No. 3 to the first auxiliary brush 23 corresponding to the commutator No. 5, the rotational speed of the motor 20 would be increased.

In summary, when the multistage switch 30 is switched to make the negative brush 22 connect to the negative DC voltage V−, a rotational speed of the shaft of the motor 20 is the lowest so that the releasing speed of the actuator 100 is the lowest. On the contrary, when the multistage switch 30 is switched to make the second auxiliary brush 23 corresponding to the commutator No. 5 connect to the negative DC voltage V−, the rotational speed of the shaft of the motor 20 is the highest so that the releasing speed of the actuator 100 is the highest. Moreover, when the multistage switch 30 is switched to make the first auxiliary brush 23 corresponding to the commutator No. 3 connect to the negative DC voltage V−, the rotational speed of the shaft of the motor 20 is between the lowest and the highest so that the releasing speed of the actuator 100 is between the lowest and the highest. Accordingly, the rotational speed of the motor 20 is changed to control the movement speed of the actuation rod 11 by switching one of the negative brush 22 and the at least one auxiliary brush 23 to connect to the negative DC voltage V−, thereby changing the releasing speed of the actuator 100.

In addition, if the number of the at least one auxiliary brush 23 is three, the angle increment can be calculated to be 45 degrees according to the formula: $D=180/(N+1)$, when $N>1$. Correspondingly, the number of the commutators 24 needs to increase, for example, the number of the commutators 24 increases from twelve to sixteen. At this condition, the positive brush 21 and the negative brush 22 correspond to the commutator No. 9 and the commutator No. 1, respectively. Also, the three auxiliary brushes 23 correspond to the commutator No. 7, the commutator No. 5, and the commutator No. 3, respectively. Accordingly, the angle increment formed between the negative brush 22 and each of the at least one auxiliary brush 23 is 45 degrees to provide a four-stage selection of the releasing speed of the actuator 100. The detail description of designing more than four-stage section is omitted here for conciseness.

Figure 6:
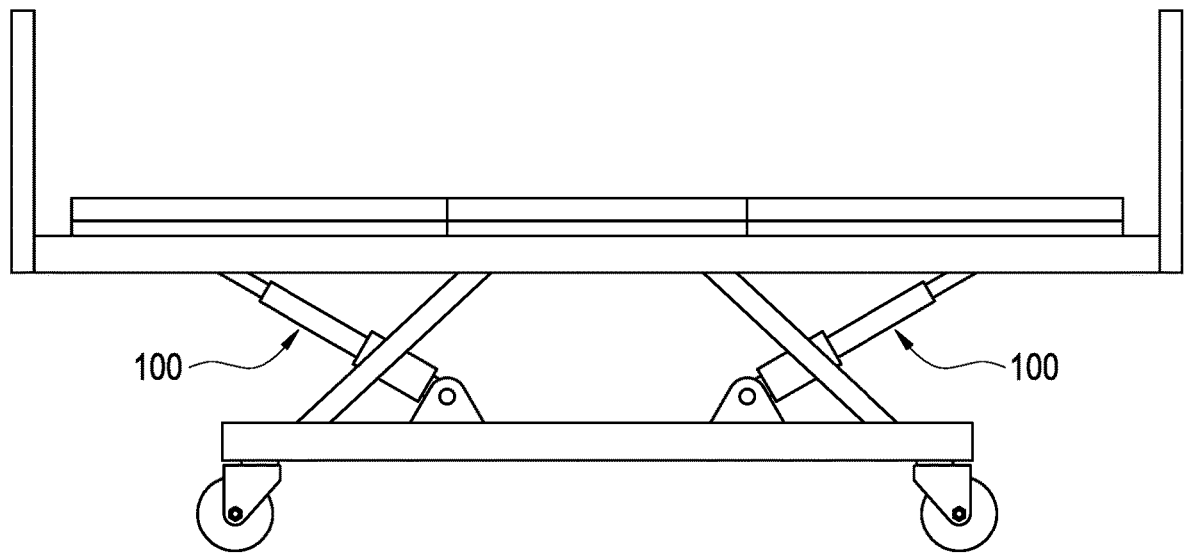
FIG. 6 is a schematic view of applying the actuator to an electric hospital bed of the present disclosure.
Figure 7:
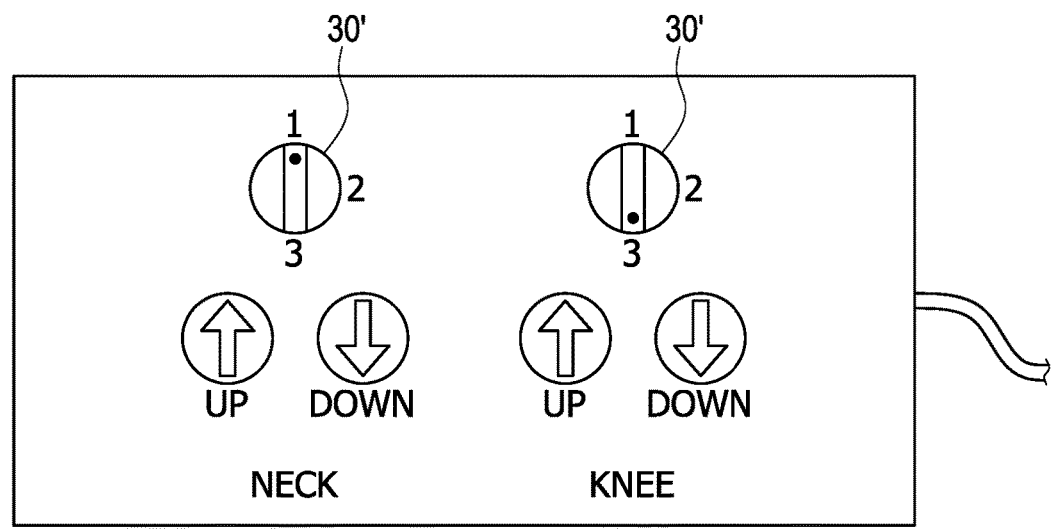
FIG. 7 is a schematic view of a control device with a multi-stage switching function according to the present disclosure.

Please refer to FIG. 6 and FIG. 7, which show a schematic view of applying the actuator to an electric hospital bed and a schematic view of a control device with a multi-stage switching function according to the present disclosure, respectively. As shown in FIG. 6, the actuator 100 is, for example but not limited to, applied to an electric hospital bed. For example, two actuators 100 are used, and one is used for a neck height adjustment and the other is used for a knee height adjustment. Also shown in FIG. 7, two actuators 100 are used for adjusting level and/or elevation of the electric hospital bed, and one is used for the neck adjustment and the other is used for the knee adjustment. For the neck adjustment, when the operator selects (switches) a changeover switch 30' to a first stage speed selection, it means that the actuators 100 of the neck adjustment could provide the normal (low) releasing speed. Afterward, when the operator presses or long presses an up button or a down button, the actuation rod 11 of the actuators 100 of the neck adjustment moves in the normal (low) speed to adjust the level and/or elevation of the neck part of the electric hospital bed.

Similarly, when the operator selects (switches) the changeover switch 30' to a third stage speed selection for the knee adjustment, it means that the actuators 100 of the knee adjustment could provide the high releasing speed. Afterward, when the operator presses or long presses the up button or the down button, the actuation rod 11 of the actuators 100 of the knee adjustment moves in the high speed to adjust the level and/or elevation of the knee part of the electric hospital bed. Accordingly, the electric hospital bed could quickly restore to the original horizontal position for the emergency medical treatment by switching the changeover switch 30' (to the third stage speed selection) to make the actuators 100 operate in the high releasing speed once an emergency situation occurs, and therefore to seize the golden hours of saving the patient's life to offer more timely and completely emergency medical treatment for the patient.

In conclusion, the present disclosure has following features and advantages:

1. The rotational speed of the motor is changed to control the movement speed of the actuation rod by switching one of the negative brush and the at least one auxiliary brush to connect to the negative DC voltage, thereby providing a multi-stage selection of the releasing speed of the actuator.

2. The electric hospital bed could quickly restore to the original horizontal position for the emergency medical treatment by switching the changeover switch to the high speed selection to make the actuators operate in the high releasing speed once an emergency situation occurs, and therefore to seize the golden hours of saving the patient's life to offer more timely and completely emergency medical treatment for the patient.

3. The actuator with switchable releasing speed can be applied in flexibility and adaptability to the electric hospital beds, electric dental chairs, electric lifting wheelchairs, electric computer tables, and so on.

4. Due to the absence of the high-speed releasing mechanism, it could minimize the volume of the actuator and reduce the effect of installation distance and appearance of the product.

5. The releasing speed of the actuator of the present disclosure is faster than that of the conventional actuator and the releasing operation of the actuator is not affected by the loads and the lead of the screw.

6. The multi-stage switching operation and releasing operation are controlled by the control device instead of the manual operation, and thereby achieving convenient and quick operation of the actuator of the present disclosure.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An actuator with switchable releasing speed, comprising:
   an actuation rod;
   a screw screwed into the actuation rod; and
   a motor configured to drive the screw rotating so that the actuation rod axially moves relative to the screw; the motor comprising:
   a stator having a plurality of permanent magnet poles;
   a rotor having a plurality of windings, and the rotor rotating relative to the stator;
   a plurality of commutators correspondingly connected to the windings; and
   at least three brushes, comprising:
   a positive brush connected to a positive direct-current voltage;
   a negative brush; and
   at least one auxiliary brush;
   wherein one of the negative brush and the at least one auxiliary brush is adjusted to connect to a negative direct-current voltage so as to change a rotational speed of the rotor of the motor, whereby controlling a movement speed of the actuation rod.

2. The actuator with switchable releasing speed in claim 1, further comprising:
   a worm wheel connected to the screw; and
   a worm gear having two ends, one end connected to a shaft of the rotor of the motor and the other end engaged with the worm wheel;
   wherein when the shaft of the rotor rotates, the worm gear drives the worm wheel rotating to drive the screw so that the actuation rod axially moves relative to the screw.

3. The actuator with switchable releasing speed in claim 2, wherein an angle increment between the negative brush and each of the at least one auxiliary brush is:
   D=60, when N=1;
   D=180/(N+1), when N>1;
   where D is the angle increment (unit in degree) and N is the amount of the at least one auxiliary brush.

4. The actuator with switchable releasing speed in claim 3, wherein the at least one auxiliary brush is arranged at the same side in which the positive brush is collinear with the negative brush.

5. The actuator with switchable releasing speed in claim 1, further comprising:
   a multistage switch comprising:
   a common contact connected to the negative direct-current voltage; and
   a plurality of tapping contacts respectively connected to the negative brush and the at least one auxiliary brush;
   wherein one of the tapping contacts is switched to connect to the common contact so that the negative brush or the at least one auxiliary brush is connected to the negative direct-current voltage through the common contact.

6. The actuator with switchable releasing speed in claim 2, further comprising:
   a multistage switch comprising:
   a common contact connected to the negative direct-current voltage; and
   a plurality of tapping contacts respectively connected to the negative brush and the at least one auxiliary brush;
   wherein one of the tapping contacts is switched to connect to the common contact so that the negative brush or the at least one auxiliary brush is connected to the negative direct-current voltage through the common contact.

7. The actuator with switchable releasing speed in claim 3, further comprising:
   a multistage switch comprising:
   a common contact connected to the negative direct-current voltage; and
   a plurality of tapping contacts respectively connected to the negative brush and the at least one auxiliary brush;
   wherein one of the tapping contacts is switched to connect to the common contact so that the negative brush or the at least one auxiliary brush is connected to the negative direct-current voltage through the common contact.

8. The actuator with switchable releasing speed in claim 5, wherein the movement speed of the actuation rod is the lowest when the negative brush is connected to the negative direct-current voltage.

9. The actuator with switchable releasing speed in claim 6, wherein the movement speed of the actuation rod is the lowest when the negative brush is connected to the negative direct-current voltage.

10. The actuator with switchable releasing speed in claim 7, wherein the movement speed of the actuation rod is the lowest when the negative brush is connected to the negative direct-current voltage.

11. The actuator with switchable releasing speed in claim 5, wherein the movement speed of the actuation rod is the highest when the at least one auxiliary brush which is the farthest away from the negative brush is connected to the negative direct-current voltage.

12. The actuator with switchable releasing speed in claim 6, wherein the movement speed of the actuation rod is the highest when the at least one auxiliary brush which is the farthest away from the negative brush is connected to the negative direct-current voltage.

13. The actuator with switchable releasing speed in claim 7, wherein the movement speed of the actuation rod is the highest when the at least one auxiliary brush which is the farthest away from the negative brush is connected to the negative direct-current voltage.

14. The actuator with switchable releasing speed in claim 5, wherein the movement speed of the actuation rod is between the lowest and the highest when the at least one auxiliary brush which is between the negative brush and the farthest away from the negative brush is connected to the negative direct-current voltage.

15. The actuator with switchable releasing speed in claim 6, wherein the movement speed of the actuation rod is between the lowest and the highest when the at least one auxiliary brush which is between the negative brush and the farthest away from the negative brush is connected to the negative direct-current voltage.

16. The actuator with switchable releasing speed in claim 7, wherein the movement speed of the actuation rod is between the lowest and the highest when the at least one auxiliary brush which is between the negative brush and the farthest away from the negative brush is connected to the negative direct-current voltage.

17. The actuator with switchable releasing speed in claim 1, wherein the windings and the commutators are designed as a symmetrical lap winding.

18. The actuator with switchable releasing speed in claim 1, wherein the motor is a permanent magnet direct-current motor.

19. The actuator with switchable releasing speed in claim 1, wherein the screw is a non-self-locking screw.

20. The actuator with switchable releasing speed in claim 1, wherein the permanent magnet poles of the stator are alternately arranged in a circumferential direction of the stator; the windings of the rotor are correspondingly wound on grooves of an iron core of the rotor.

* * * * *